United States Patent [19]

Kuper

[11] Patent Number: 4,575,051

[45] Date of Patent: Mar. 11, 1986

[54] GUIDE AND SUPPORT MEMBER FOR CUTTING TORCHES, WIRE WELDERS, AND THE LIKE

[76] Inventor: James D. Kuper, 12683 Woodpecker Dr., Tunner, Oreg. 97392

[21] Appl. No.: 661,138

[22] Filed: Oct. 15, 1984

[51] Int. Cl.$^4$ .............................................. B23K 5/24
[52] U.S. Cl. .......................................... 266/66; 269/1
[58] Field of Search ................. 269/1; 266/66, 67, 68

[56] References Cited

U.S. PATENT DOCUMENTS

| | | | |
|---|---|---|---|
| 1,759,288 | 5/1930 | Temple | 266/68 |
| 3,698,701 | 10/1972 | Straub | 266/66 |
| 4,283,043 | 8/1981 | Kalian | 266/68 |
| 4,469,311 | 9/1984 | Laing | 266/67 |

Primary Examiner—Melvyn J. Andrews
Attorney, Agent, or Firm—Eugene M. Eckelman

[57] ABSTRACT

A body member has a central aperture and a set screw in an arrangement for mounting on the depending tip of a tool. The body member supports a guide engaging roller in an eccentric relation whereby the roller is arranged to be adjustably rotated such that the surface thereof can be positioned selectively relative to the tip. The roller has a grooved edge for guided engagement on the edge of an upstanding guide. The roller in its eccentric support is arranged for various types of guide functions including roller engagement of a guide, a rolling engagement on a workpiece, or an out-of-the-way position for guided engagement of a support therefor against a guide.

5 Claims, 8 Drawing Figures

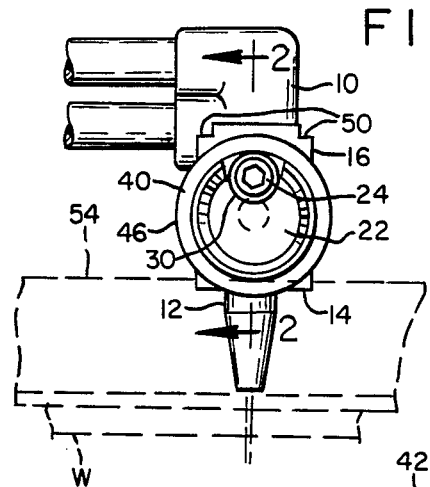
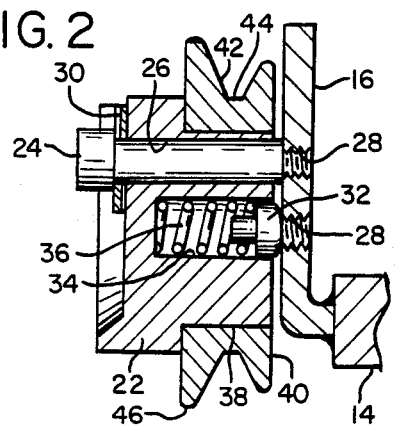
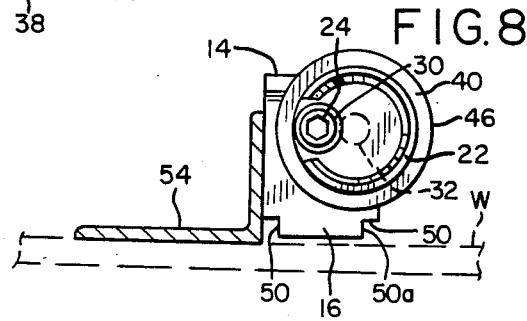
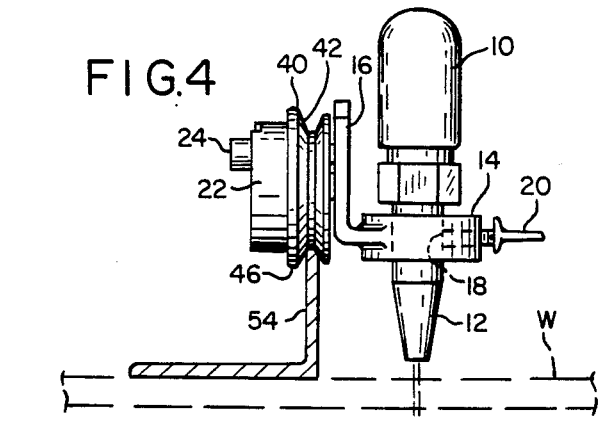
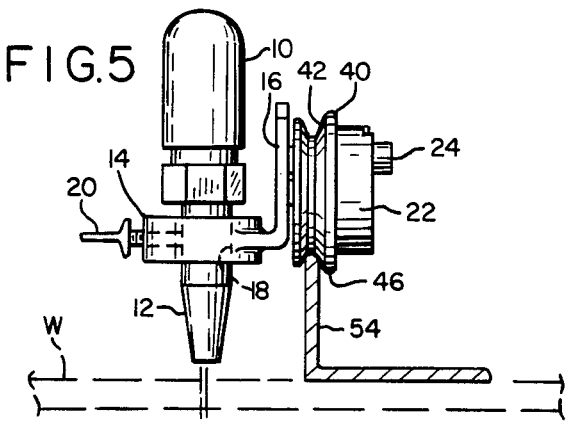
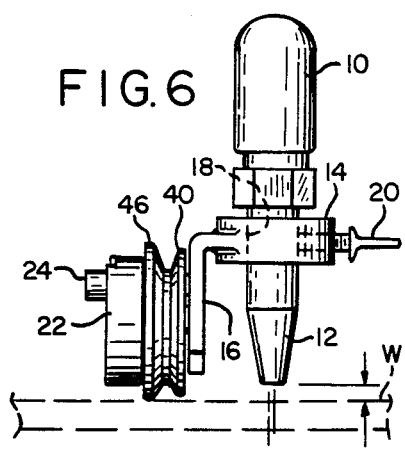
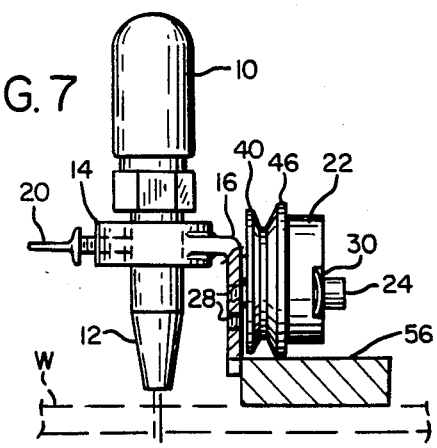

4,575,051

GUIDE AND SUPPORT MEMBER FOR CUTTING TORCHES, WIRE WELDERS, AND THE LIKE

BACKGROUND OF THE INVENTION

This invention relates to new and useful improvements in a guide and support member for cutting torches, wire welders, and the like.

Various types of guides and supports have heretofore been provided for the purpose of guiding and moving tools such as cutting torches along a line to be cut. Many torch operators use a burning square but this type of guide is not entirely satisfactory because considerable dexterity and guesswork are required for cutting along a line. Also, this type of guide does not control the spacing between the torch tip and the workpiece and tips thus are frequently melted. Some previous guides and tip structures or attachments have been proposed, but such guides or attachments do not possess a combination of all the desired features, namely, of being simplified in structure, of being readily adaptable to and mountable on most existing torch tips, of being capable of controlling the height of the tip above the work piece, of being operable substantially friction free, and of being capable of positioning a guide member for location of the burning tip on precisely a line to be cut.

SUMMARY OF THE INVENTION

According to the present invention, a novel guide and support is provided for association with a tool such as a torch tip which possesses a combination of all the desired features set forth above, thus amounting to a substantial improvement over prior devices. For the purpose of accomplishing such objective, the device includes a body member arranged to be secured for example to a cutting tip. This body member carries a guide engaging roller and a means supporting the roller on the body member in position such that the axis of the roller extends at right angles to the tip. The roller is supported by adjustable eccentric means whereby it is arranged to be adjustably rotated such that the peripheral edge thereof can be positioned selectively relative to the tip. Spring pressed means are provided to hold the roller support at selective adjusted positions. The roller has a groove around its edge for engagement with an upstanding guide or it can be adjusted relative to the tip to roll on a workpiece surface.

The invention will be better understood and additional objects and advantages will become apparent from the following description taken in connection with the accompanying drawings.

BRIEF DESCRIPTION OF THE DRAWINGS

FIG. 1 is a side elevational view of a cutting torch guide and support member embodying features of the present invention, a roller engaging member being shown in rolling engagement with an upstanding guide;

FIG. 2 is an enlarged fragmentary sectional view taken on the line 2—2 of FIG. 1;

FIG. 3 is an exploded perspective view of the present invention;

FIGS. 4, 5, 6 and 7 are front elevational views showing various ways of using the invention; and FIG. 8 is a side elevational view showing a structural detail of the body member of the guide and support member.

DETAILED DESCRIPTION OF A PREFERRED EMBODIMENT

The present invention is illustrated herein in connection with a cutting torch. It may be used, however, with other types of tools having need therefor such as wire welders.

The numeral 10 designates a conventional cutting torch having a depending tip 12. The invention comprises a disc-like body member 14 having an integral right angle extension or arm 16. Body member 14 has a central aperture 18 arranged to freely receive the tip 12 of a torch. A radially extending set screw 20 is threadedly mounted in the body member for releasably attaching the body member on the torch tip. Aperture 18 may be of a size to receive most conventional sizes of tips.

A hub member 22 is mounted on the extension 16 of the body member by means of a shoulder bolt 24 extending through a bore 26 in the hub member and threadedly engaged in a selected tapped bore 28 in the extension 16. Bolt 24 is offset from the center of the hub and provides eccentric adjustable movement of the hub. A spring washer 30 is contained between the head of the bolt and the hub member to provide resistance of rotation between the hub and the bolt. Primary resistance of rotation, however, for the hub is provided by a plunger 32 contained in a bore 34 leading inwardly of the hub from the side facing the extension 16 and terminating short of the other end. Plunger 32 is biased by a spring 36 in the bore and frictionally bears against the adjacent surface of the extension with sufficient force such that the hub will remain in a set position on its eccentric support for providing guided support of a torch. The hub can be forcefully adjusted by hand, however, to other positions around its eccentric support.

Hub 22 has a surface groove 38 on its inner end forming a rotatable support for a roller 40 having a V-shaped groove 42 on its edge. Groove 42 has a flat bottom surface 44 which provides free rolling engagement on the edge of an upstanding guide member as will be more apparent hereinafter. One defining flange 46 of the grooved roller is longer than the other flange providing a minimum rolling friction when the stabilizing member is utilized to roll along a surface.

The free end of extension 16 has a notch 50 on each side for a purpose to be described.

The present guide and support member has many different types of guiding functions in association with a cutting torch. One such function is shown in FIGS. 1 and 4 wherein such member when mounted on a tip is utilized with an angle iron guide 54. When used with this type of guide, the hub 22 is rotated selectively on its eccentric so that as the roller engages the top edge of the angle iron, the tip is positioned the proper height relative to a workpiece to prevent melting of the tip. The support in the operation of the torch rolls freely on the upper edge of the angle iron in substantially a friction free movement, thus requiring minimum effort by the operator. FIG. 5 shows a similar use except that when the angle iron faces in the opposite direction, it is merely necessary to re-position the body member on the other side of the tip.

It may be desired that the torch be used without a guide. For this purpose, FIG. 6, the body member 14 is mounted on the tip with the extension 16 pointed downwardly. Also, hub member 22 is rotated around its eccentric such that the peripheral edge thereof projects beyond the free end of the extension 16. The hub is positioned such that the roller when engaging the workpiece selectively spaces the bottom of the tip at the desired distance from the workpiece. In order to accomplish the functions of the roller, it is apparent that the dimension of the parts as well as the location of the eccentric support 26 are such that the roller can project beyond the free end of the extension 16 an amount sufficient to space the tip from the workpiece.

With reference to FIG. 7, the present guide and support member may be utilized with a flat metal guide 56 such as a burning square. For this purpose, body member 14 is mounted on the tip such that the extension 16 depends downwardly. However, the hub member 22 is adjusted on its eccentric such that the bottom plane of the roller is above the free end of the extension 16. According to this guide arrangement, the projecting portion of the extension 16 can engage the side edge of the guide 56 for guided movement of the tip. Here again, the hub member 22 is rotated on its eccentric to selectively position the tip the desired distance above the workpiece.

Extension 16 has a selected width for positioning a guide member, such as the angle iron 54, a predetermined distance from a line to be cut. The notches 50 are provided for accommodating different types of guides. For example, with reference to FIG. 8, upon swinging the hub member 22 up out of the way, the width of the extension 16 can be utilized to place the guide 54 selectively relative to a line to be cut. However, since one spacing will use the face of the extension 16, FIG. 7, and another spacing will use the roller groove, FIGS. 4 and 5, such difference in spacing is compensated for by the notches 54. Thus, the inside wall 50a of notches 50 is used for alignment with a cut line on those types of guides which utilize the edge of the extension 16 and the outer edge of the extension 16 is used when the roller is to be used, the width of the notches 50 thus comprising the distance that will be offset from the cut line by use of the roller.

It is apparent that the present guide and support member has many guiding functions and is simplified in structure and easy to use. It is readily adaptable to and mountable on existing torch tips, wire welders, or other devices having a tip or sleeve adaptable for mounting in the body member 14. The eccentric hub is capable of controlling the height of the tip above the workpiece to prevent melting of the tip. The roller provides a novel association with different types of guides. The invention operates substantially friction free and also has the capability of locating a guide member relative to a cut line. The shoulder bolt 24 is selectively mounted in one of the vertically spaced bores 28 to accommodate tip length, angle iron guide dimensions, and any other reason requiring the desired spacing of the tip from the work.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A guide and support member for tools of the type having a depending tip comprising
   a rigid disc having an upright aperture arranged to receive a tip of a tool,
   means in said disc arranged to secure said disc to a depending tool tip,
   an upright arm on said disc,
   a hub member supported eccentrically on said arm on a horizontal axis,
   and a roller supported rotatably on said hub member,
   said roller having a diameter greater than said hub member and having a rolling edge for engaging guide means,
   said hub member being adjustable rotatably on its eccentric support to position said roller vertically relative to said disc for selectively positioning a tip to which said disc is secured in spaced relation from a work piece.

2. The guide and support member of claim 1 including spring pressed means acting between said hub member and said arm for holding said roller in a manually adjustable set position.

3. The guide and support member of claim 1 wherein said roller has a groove around its rolling edge for guided engageable movement on the edge of an upstanding guide.

4. The guide and support member of claim 1 wherein said disc is arranged to be inverted on a tool tip whereby in one position thereof and selective eccentric positioning of said hub member, said roller is arranged to engage a guide above the work piece and in another position and selective eccentric positioning of said hub member said roller is arranged to directly engage a workpiece.

5. The guide and support member of claim 1 wherein said roller has a groove around its rolling edge for guided engagement movement on the edge of an upstanding guide, said hub member having a first selected position on its eccentric support to allow said engageable movement of said rolling edge of said roller on an upstanding guide and a second selected position on its eccentric support to allow engageable movement of said arm against a guide, and means on said arm for determining the positioning of said disc relative to a reference line depending upon the use of said hub member in its first or second positions.

* * * * *